United States Patent [19]
Flynt

[11] 3,994,264
[45] Nov. 30, 1976

[54] DOG RESTRAINING HARNESS

[76] Inventor: William M. Flynt, 2419-G Hollendale Circle, Arlington, Tex. 76010

[22] Filed: Dec. 13, 1974

[21] Appl. No.: 532,324

[52] U.S. Cl. .................................. 119/96; 54/71; 119/126
[51] Int. Cl.² ........................................ A01K 15/04
[58] Field of Search ............ 119/96, 100, 101, 106, 119/99, 109, 126, 105, 107, 143, 145, 146, 128; 54/71, 87, 84, 23, 4

[56] References Cited
UNITED STATES PATENTS

| 161,461 | 3/1875 | Walling | 119/28 X |
| 369,548 | 9/1887 | Parrish | 119/126 |

FOREIGN PATENTS OR APPLICATIONS

| 30,515 | 1927 | France | 54/71 |
| 1,963 | 8/1900 | Germany | 119/126 |

Primary Examiner—Robert Peshock
Assistant Examiner—Peter K. Skiff
Attorney, Agent, or Firm—Wofford, Felsman, Fails & Zobal

[57] ABSTRACT

The specification discloses a harness for a dog for preventing the dog from jumping. The harness comprises a loop to be fitted around the dog's neck and having a strap extending under the dog to two loop-shaped straps to be fitted around the hind legs. A strap is connected to each of the loop-shaped straps and extends over the dog's hind quarters for holding the two loop-shaped straps high around the dog's hind legs.

4 Claims, 1 Drawing Figure

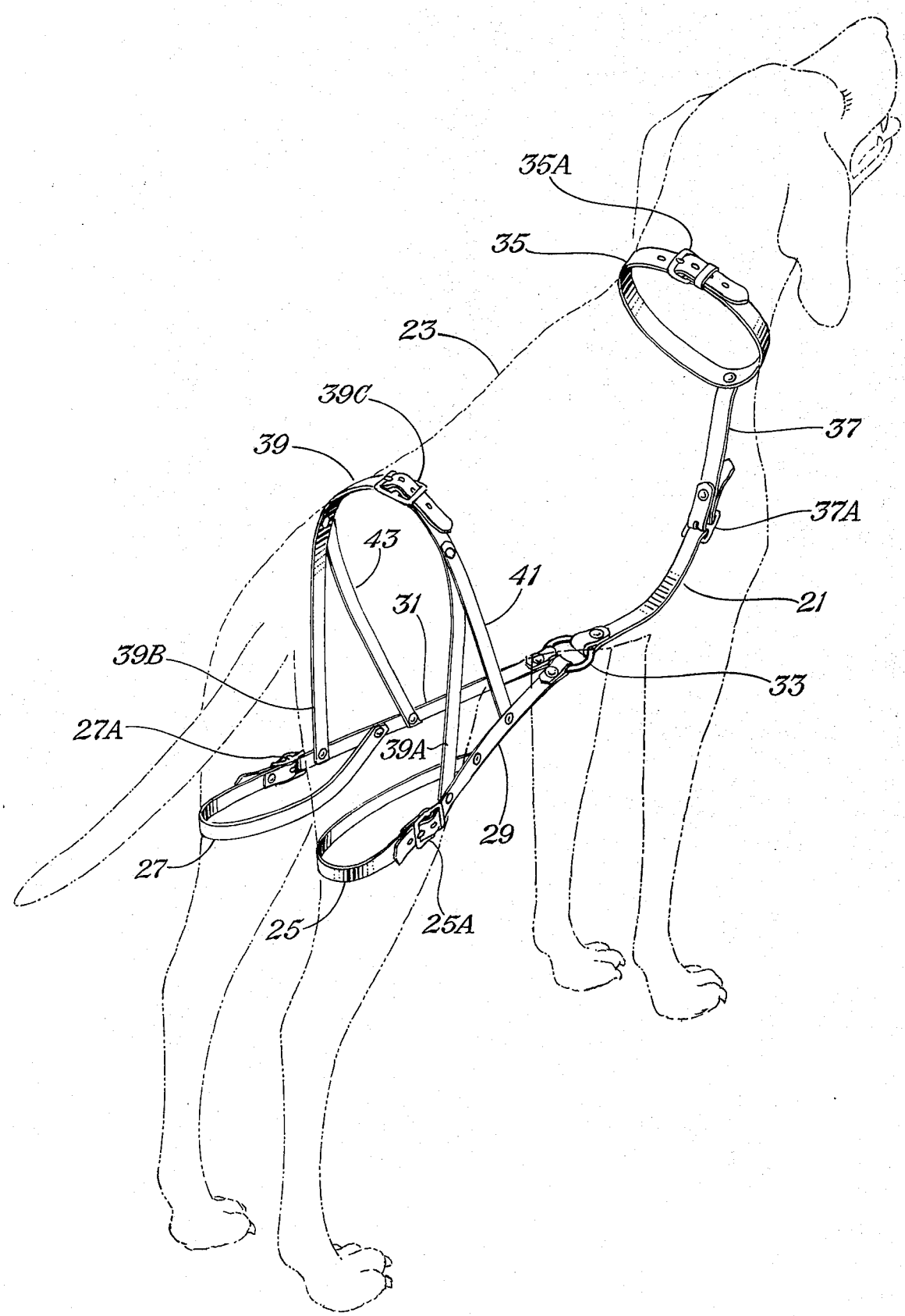

DOG RESTRAINING HARNESS

BACKGROUND OF THE INVENTION:

This invention relates to a harness for a dog for preventing the dog from jumping.

Although many families find dogs desirable and hence maintain dogs in their homes and yards, dogs have objectionable habits in that they tend to jump on furniture, over fences, or on people.

SUMMARY OF THE INVENTION:

It is an object of the present invention to provide a simple and inexpensive harness for a dog to prevent the dog from jumping yet which allows the dog freedom in walking, running, or performing other normal activities.

The harness comprises two loop-shaped straps adapted to be fitted around the hind legs of a dog. Strap means are connected to each loop-shaped strap and are coupled together by a connecting means adapted to be located under the chest of the dog. A neck loop is adapted to be fitted around the dog's neck. An intermediate strap is provided having a first end connected to said connecting means and a second end connected to said neck loop. Strap means is connected to said two loop-shaped straps and is adapted to extend over the dog's hind quarters for holding said two loop-shaped straps high around the dog's hind legs.

BRIEF DESCRIPTION OF THE DRAWING:

The FIGURE shown illustrates the dog harness of the present invention strapped in place to a dog.

DETAILED DESCRIPTION OF THE INVENTION:

Referring to the drawing, the dog harness of the present invention is identified by reference numeral 21 and is shown strapped in place to a dog illustrated in dotted lines and identified at 23. The dog harness comprises two loop-shaped straps 25 and 27 adapted to be fitted around the hind legs of the dog. Straps 29 and 31 are connected to the loop-shaped straps 25 and 27 and are connected together to a metal ring 33 adapted to be fitted under the dog's chest. A neck loop 35 is provided which is adapted to be fitted around the dog's neck. An intermediate strap 37 has one end connected to the ring 33 and the other end connected to the neck loop 35. A strap 39 has ends 39A and 39B connected to the loops 25 and 27 respectively and is adapted to extend over the hind quarters of the dog for holding the loops 25 and 27 high around the dog's hind legs. Straps 41 and 43 are connected to straps 29 and 31 and to opposite sides of strap 39 respectively for preventing strap 39 from sliding backward off of the dog.

Loops 25, 27, and 35 include buckles 25A, 27A, and 35A for adjustment purposes. In addition, straps 37 and 39 include buckles 37A and 39C for adjustment purposes. Loops 25, 27, and 35, and straps 29, 31, 37, 39, 41, and 43 preferably are formed of soft leather.

After the harness has been fitted in place to a dog, as illustrated, the harness will prevent the dog from jumping yet will allow the dog freedom in walking, running, or performing other activities, as indicated above. In this respect, when a dog jumps, it first raises its head. Since the neck loop 35 is connected directly to the hind leg loops 25 and 27 by way of straps 37 and 29 and 31, when the dog raises its head to jump, there will be force applied directly to the hind leg loops 25 and 27 and hence to the hind legs which will prevent the dog from rearing up thereby preventing the dog from jumping. Since the hind leg loops 25 and 27 are maintained high around the dog's hind legs by the strap 39, the harness does not interfere with other activities of the dog such as walking, running, etc.

I claim:

1. A harness for a dog for preventing the dog from jumping comprising:

two loop-shaped straps adapted to be fitted around the hind legs of a dog, two strap means connected at their rearward ends to each loop-shaped strap respectively and extending forwardly and coupled together at their forward ends by connecting means; the forward ends adapted to be located wholly under the dog near its chest, a neck loop adapted to be fitted around the dog's neck, an intermediate strap having a rearward end connected to said connecting means and a forward end connected to the bottom of said neck loop; said intermediate strap extending downwardly and rearwardly from the bottom of the neck loop and adapted to be located in front and below the chest of the dog; and a U-shaped support strap having its ends connected to said two loop-shaped straps respectively and extending over the dog's hind quarters for holding said two loop-shaped straps high around the dog's hind legs, said strap means, connecting means, and intermediate strap being of selected lengths to provide a taut connection between the bottom of said neck loop and said loop-shaped straps when the bottom of said neck loop is raised a selected distance; whereby a forward acting force will be applied to the rear legs if the dog raises its head to jump, thereby preventing the dog from jumping.

2. The harness of claim 1 wherein:

said loop-shaped straps and said neck loop each includes adjustment means for adjusting the size of said loop-shaped straps and of said neck loop respectively, said intermediate strap and said strap means each includes adjustable means for adjusting the length thereof.

3. The harness of claim 1 comprising:

two straps each connected at its lower end to one of said strap means respectively, forward of the ends of said support strap;

each of said straps being connected at its upper end to one side respectively of said support strap for preventing said support strap from sliding backward off of the dog.

4. The harness of claim 1 wherein the connecting means comprises a ring located wholly under the dog near its chest.

* * * * *